July 7, 1942.         R. S. DEAN         2,288,610
TREATMENT OF ORES
Filed Jan. 23, 1942
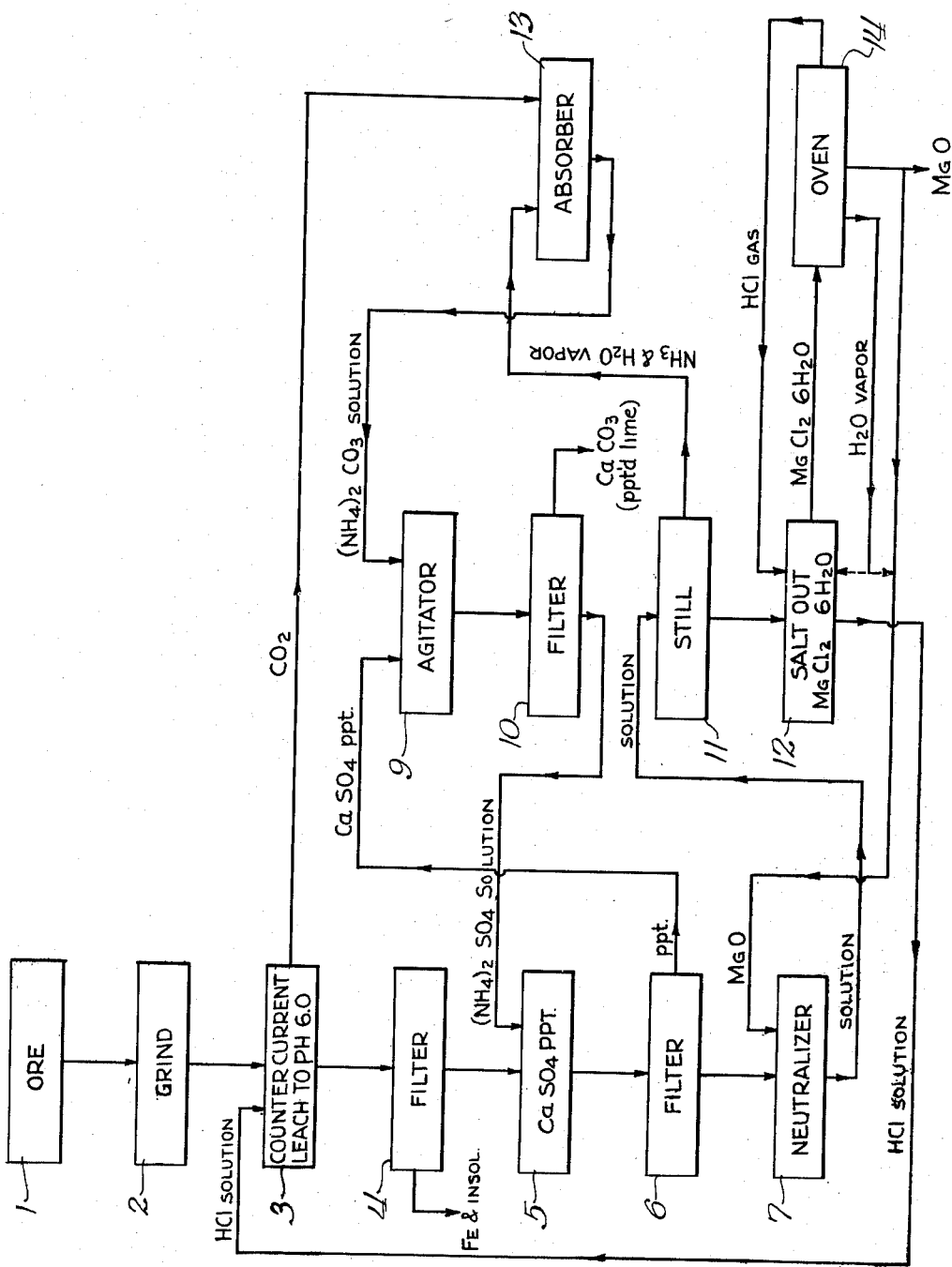
INVENTOR.
Reginald S. Dean
BY John J. McLaughlin
Attorney Patented July 7, 1942

2,288,610

UNITED STATES PATENT OFFICE 2,288,610

TREATMENT OF ORES

Reginald S. Dean, Salt Lake City, Utah

Application January 23, 1942, Serial No. 427,943

6 Claims. (Cl. 23—66)

(Granted under the act of March 3, 1883, as amended April 30, 1928; 370 O. G. 757)

This invention described herein may be manufactured and used by or for the Government for governmental purposes, without the payment to me of any royalty hereon.

This invention relates to a cyclic process for treating mixed alkaline earth metal ores such as ores of magnesium and calcium, e. g., dolomite, to produce magnesia and/or precipitated chalk therefrom.

In the practice of the invention, acid-soluble ores of the alkaline earth metals which include magnesium are treated with mineral acids or acid solutions. The process is applicable to dolomite, calcareous magnesite, calcareous brucite, ankerite or aggregates containing acid-soluble magnesium and other alkaline earth metals.

One manner of carrying out the cyclic process of my invention is indicated in the accompanying drawing, comprising a flow sheet for the treatment of dolomite. While the drawing shows a preferred embodiment of the process, it may be widely modified within the scope of my invention and may be used in the treatment of any acid-soluble ore of magnesium containing other alkaline earths.

To leach the ore, I employ mineral acids, such as hydrochloric acid, to yield a solution containing magnesium and an amount of alkaline earth metal, such as calcium. Hydrochloric acid lends itself very well to the cyclic process described herein. The leach solution will normally contain iron and some additional heavy metals.

To purify the solution of iron and the heavy metals, I ordinarily employ a counter-current leach, or treat the leach solution with a relatively high-grade acid-soluble magnesium ore such as magnesite, with MgO produced in the final calcining step, or the like, to produce a neutral leach solution with a pH of preferably about 6.0. The iron and heavy metals are, to a practical degree, removed from solution by this treatment. The leach solution is separated from the solids by sedimentation, filtration or the like.

To the leach solution, ammonium sulphate, ordinarily in solution, is added to precipitate the alkaline earth sulphates other than magnesium. Sufficient ammonium sulphate is added to remove these alkaline earth metals, e. g., calcium, substantially entirely from the solution. They precipitate as insoluble sulphates. The liquid and solid phase are separated by known, desirable means, such as filters, thickeners, classifiers, sedimentation tanks, and the like.

The solution from the preceding step is then treated with an oxide or hydroxide of the alkaline earth or alkali metal group, preferably magnesia or hydrated magnesia, to convert the ammonium sulphate therein to a form which may be removed from the solution by distillation. This neutralized liquor, after optionally separating any solids present, is treated in an ammonia still or digestor, to yield gaseous ammonia or ammonium compounds, and a solution relatively free of ammonium compounds.

The solution is next treated with hydrochloric acid gas, to precipitate a magnesium chloride, preponderantly $MgCl_2.6H_2O$. The solid phase is then separated from the liquid phase of the treated system. The acidulated solution, from which the magnesium has been to a large degree removed, is returned to leach fresh ore.

The pricipitated magnesium chloride hexahydrate is then subjected to calcination. This treatment yields magnesia, as a final product, hydrochloric acid gas, and water vapor. This phase of the process is further discussed by Lloyd in his co-pending application, Serial No. 427,863, filed Jan. 23, 1942. The hydrochloric acid gas so produced may be used to salt-out magnesium chloride as hereinbefore described. The water vapor may be returned to the salting-out step or preferably to the acidulated liquor from this step, after its separation from the $MgCl_2.6H_2O$.

The ammonia, from the distilling operation above described, is reacted with carbon dioxide gas and ordinarily water vapor, to yield ammonium carbonate, ordinarily in solution. Its use is hereinafter described. The carbon dioxide is usually secured from the leach reaction of acids and carbonate (e. g., dolomite) ores; however, it may be secured from other desirable sources, such as the combustion gases from the burning of fuels or the calcination of carbonates.

The alkaline earth sulphate, such as calcium sulphate (gypsum), secured from the purification of the leach liquor by ammonium sulphate, as heretofore described, is reacted in suitable equipment, such as agitators, with the ammonium carbonate solution heretofore described. By double decomposition, final products are obtained comprising ammonium sulphate in solution, and calcium carbonate. The separated calcium carbonate is a finished product; the filtered ammonium sulphate solution is further utilized to purify the leach liquor of the alkaline earths, as previously described, and as shown in the drawing.

The acid in the leach liquor may be neutralized to any desired degree; however, I find it expedient to carry this neutralization to a degree in which the iron and most of the heavy metals are removed from solution, and that this degree lies above a pH of about 5.0, and preferably between about 6.0 to 6.5. The iron and heavy metal purification may be advantageously effected by treatment with calcite or magnesite or the like in a further intermediate step; however, this is optional. Ordinarily, the leach procedure above serves to sufficiently purify the liquor of these heavy metals.

The acid leach of many of the ores, e. g., dolomite, may be hastened by heating the reacting substances, or the leach liquor; however, this is an optional procedure, to be used or not as determined by the conditions and economies involved.

Some small amounts of impurities ordinarily will remain in the solution after the $MgCl_2.6H_2O$ salting-out step, and be returned to the leach circuit. This, however, does not affect the purity of the products produced.

The process, as will be apparent, has three closed circuits, namely: (1) the acid leach circuit; (2) the ammonia circuit, and (3) the $HCl-MgCl_2.6H_2O$ circuit.

One specific example of the manner of carrying out my invention may be given by reference to the attached drawing. An ore comprising a true dolomite with substantially equal proportions of calcium and magnesium as the carbonate, including gangue constituents and iron as a leachable impurity, is crushed and ground to about 50 mesh. The ore is placed in a leach tank at 3 and 4-normal hydrochloric acid is passed through the leach tank until the leach solution has a pH of 6. All of the leach liquor is withdrawn leaving the gangue constituents in the leach bath and the leach liquor is passed through a filter at 4 to remove any insoluble constituents present, principally iron, as the hydrate. To 100 liters of the resulting solution, consisting essentially of calcium and magnesium chloride, 2 liters of an ammonium sulphate solution are added, the concentration of ammonium sulphate in such solution being 35 grams per liter. Preferably only enough ammonium sulphate is introduced to precipitate substantially all of the calcium as the sulphate. In practical operations, however, some sulphate ions will remain in the solution and substantially all of the ammonium ions. The precipitated calcium sulphate is filtered at 6 and the calcium sulphate precipitate is delivered to an agitator at 9 which will be later discussed. The solution is introduced into a neutralizing tank at 7 and 10 grams of magnesium oxide produced as a final product are introduced. Such precipitate as may be formed optionally may be filtered at this point, although, in general, if the process is properly controlled no appreciable amount of precipitate will form. The solution is then delivered to a still at 11 and heated to drive off $NH_3$ with some water vapor and the ammonia so driven off is delivered to an absorber 13. The solution is then delivered to a salting-out vat 12 and hydrochloric acid gas is introduced to salt out magnesium chloride in the form of a hydrate, predominantly the hexahydrate. When the process is carried out at atmospheric pressure, the hydrochloric acid solution, after the separation of the magnesium chloride, will be approximately 4 normal, or it may be diluted or additional hydrochloric acid added as required, and delivered to the leach tank at 3 for further use. The magnesium chloride is delivered to a calcining oven where, preferably, it is treated in two stages. Optionally two ovens may be employed. In any case, the first stage is to drive off the water of crystallization. This water of crystallization may be delivered to the salting-out tank at 12 or, alternatively, at a suitable point back into the system, such as to a solution in the neutralizing tank at 7. The second stage at 14 comprises heating the magnesium chloride to a higher temperature, for example, of the order of 900 degrees C., to drive off hydrogen chloride gas which is delivered at 12 for the salting-out step. The resulting magnesium oxide is a suitable feed for an electrolytic cell for reduction to magnesium metal. A portion of this magnesium oxide, however, may be used for neutralizing purposes, as shown in the flow sheet, where required. In place of entirely converting the magnesium chloride to magnesium oxide, it may be only partially converted and will form a satisfactory feed and electrolyte for an electrodeposition process.

The ammonia gas and carbon dioxide gas, previously referred to, are delivered to the absorber 13 which may comprise a tank containing water, in which case the ammonia and carbon dioxide are bubbled into the water and combined to form an ammonium carbonate solution. This ammounium carbonate solution is delivered to the agitator at 9 with the calcium sulphate precipitate, and a resulting double decomposition produces calcium carbonate as a precipitate and ammonium sulphate. The calcium carbonate, as the precipitate, is separated at the filter 10 and comprises a final salable product. Ammonium sulphate in solution is delivered from the filter tank back to the calcium sulphate precipitation stage at 5, previously referred to.

The process is substantially self-contained in that no additional reagents need be added except such small amounts of hydrochloric acid as may be lost. This hydrochloric acid is readily supplied from available sources. Any sulphate ions remaining in solution at the salting-out stage 12 do not appreciably affect the character of the precipitate. The sulphate ions in solution, when delivered back to the leach tank, will be removed with the insolubles at stage 4 as calcium sulphate. This will represent, at most, only a very slight loss of calcium but has the advantage that sulphate ions will not build up in the solution.

Individually, some, if not all, of the reactions involved in the practice of my invention are known, although as to some of these reactions, I have not been able to find reference thereto in the technical literature. So far as I am aware, however, the process of my invention is novel. Sources of magnesium have been sought for years, from which magnesium at a suitable cost, could be produced. In general, only relatively pure sources of magnesium have been utilized, even though large deposits of minerals comprising mixtures of magnesium and other alkaline earth metals have been known. Deposits which offer some possibiliey for the physical separation of constituents of the ores have been investigated, only, however, from the standpoint of utilization of the magnesium content. My invention not only yields a relatively highly pure magnesium oxide which may be used as a feed for electrolytic or electro-thermic reduction processes, or for the production of magnesium salts or the like, but also makes available a pure grade of by-product having a regular commercial use.

What I claim as new and desire to protect by Letters Patent of the United States is:

1. A method for the production of magnesium oxide from mixed alkaline earth metal ores, which comprises leaching the ore with a hydrochloric acid solution to produce a mixed solution of alkaline earth chlorides, the pH of the solution being controlled to precipitate insolubles such as iron, treating the solution with ammonium sulphate to precipitate as the sulphate, alkaline earth metals in solution, leaving magnesium chloride in solution, heating the solution to drive off ammonia, recovering the magnesium chloride from such solution, delivering to an absorber carbon dioxide gas and the ammonia from said heating step to produce ammonium carbonate, and introducing therein the alkaline earth metal sulphate previously formed to precipitate an alkaline earth metal carbonate and form ammonium sulphate in solution, the ammonium sulphate so formed being utilized to precipitate additional alkaline earth metals from the leach solution.

2. A method of recovering the values from mixed ores of calcium and magnesium, which comprises leaching the ore with a hydrochloric acid solution and controlling the pH to produce a solution containing essentially calcium and magnesium chloride, adding ammonium sulphate to said solution to precipitate calcium sulphate, heating the resulting solution to drive off ammonia, removing magnesium chloride from such solution, combining the ammonia from the said heating step with carbon dioxide to form ammonium carbonate, bringing the precipitated calcium sulphate and ammonium carbonate into reacting relation to produce precipitated chalk and a solution of ammonium sulphate, the ammonium sulphate so produced being utilized to precipitate additional calcium sulphate from a new solution.

3. A method of recovering the values from mixed ores of calcium and magnesium, which comprises leaching the ore with a hydrochloric acid solution and controlling the pH to produce a solution containing essentially calcium and magnesium chloride, adding ammonium sulphate to said solution to precipitate calcium sulphate, neutralizing said solution with magnesium oxide, heating the resulting solution to drive off ammonia, removing magnesium chloride from such solution, combining the ammonia from the said heating step with carbon dioxide to form ammonium carbonate, bringing the precipitated calcium sulphate and ammonium carbonate into reacting relation to produce precipitated chalk and a solution of ammonium sulphate, the ammonium sulphate so produced being utilized to precipitate additional calcium sulphate from a new solution.

4. The herein described method of treating a calcium magnesium carbonate ore, which comprises leaching the ore with a hydrochloric acid solution, controlling the pH of the solution to about pH 6, passing the carbon dioxide produced to an absorber, introducing into the clear solution comprising essentially calcium and magnesium chloride, sufficient ammonium sulphate to precipitate substantially all of the calcium as the sulphate, heating the solution to drive off ammonia, introducing hydrogen chloride into the solution to salt out a magnesium chloride hydrate, delivering said ammonia to said absorber to form an ammonium carbonate solution, and introducing into said solution the calcium sulphate precipitate to form a precipitate of calcium carbonate and a solution of ammonium sulphate.

5. The herein described method of treating a calcium magnesium carbonate ore, which comprises leaching the ore with a hydrochloric acid solution, controlling the pH of the solution to about pH 6, passing the carbon dioxide produced to an absorber, introducing into the clear solution comprising essentially calcium and magnesium chloride, sufficient ammonium sulphate to precipitate substantially all of the calcium as the sulphate, neutralizing said solution with magnesium oxide, heating the solution to drive off ammonia, introducing hydrogen chloride into the solution to salt out a magnesium chloride hydrate, delivering said ammonia to said absorber to form an ammonium carbonate solution, and introducing into said solution the calcium sulphate precipitate to form a precipitate of calcium carbonate and a solution of ammonium sulphate.

6. A process as defined in claim 5, wherein said magnesium chloride hydrate is calcined to produce magnesium oxide and water vapor and hydrogen chloride gas, the latter being utilized for the salting out step and the water vapor returned to the system, the process being controlled to be cyclic and have, in addition to the magnesium chloride-hydrochloric acid solution cycle, two cycles, one in which ammonia and carbon dioxide are combined to precipitate calcium carbonate and form ammonium sulphate which is returned to the main cycle, and one in which the calcium sulphate from the main cycle is delivered to the ammonium carbonate solution for the production of the calcium carbonate.

REGINALD S. DEAN.